US010754798B1

(12) United States Patent
Burke et al.

(10) Patent No.: US 10,754,798 B1
(45) Date of Patent: Aug. 25, 2020

(54) LINK SPEED RECOVERY IN A DATA STORAGE SYSTEM

(71) Applicant: INTERNATIONAL BUSINESS MACHINES CORPORATION, Armonk, NY (US)

(72) Inventors: Seamus J. Burke, Tucson, AZ (US); Matthew D. Carson, Encino, CA (US); Gary William Batchelor, Tucson, AZ (US); Heidi Lynn McCook, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/567,320

(22) Filed: Sep. 11, 2019

(51) Int. Cl.
*G06F 3/00* (2006.01)
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 6,363,051 B1 | 3/2002 | Eslambolchi et al. |
| 7,181,653 B2 | 2/2007 | Challener et al. |
| 7,583,593 B2 | 9/2009 | Guichard et al. |
| 9,571,366 B2 | 2/2017 | Duffield et al. |
| 2002/0171896 A1 | 11/2002 | Clark et al. |

OTHER PUBLICATIONS

"PCI Express® Base Specification Revision 5.0", PCI-SIG, Version 1.0, May 22, 2019, pp. 1299.
"PCI Express", Wikipedia, [online][retrieved Aug. 19, 2019] https://en.wikipedia.org/wiki/PCI_Express, pp. 25.
"Pci Express 2.0 Scalable Interconnect Technology, TNG", AnandTech,[online][retrieved Aug. 26, 2019] https://www.anandtech.com/show/241112, pp. 4.

(Continued)

*Primary Examiner* — Henry Tsai
*Assistant Examiner* — Dean Phan
(74) *Attorney, Agent, or Firm* — William K. Konrad; Konrad Raynes Davda & Victor LLP

(57) ABSTRACT

Link speed recovery in a data storage system in accordance with the present description includes, in one aspect of the present description, repeating performance of a main loop of sequential link speed recovery commands a predetermined maximum number of times. In one embodiment, main loop performance of link speed recovery commands includes repeating performance of a subloop of sequential link speed recovery commands within each main loop performance a predetermined maximum number of times. As a result of repeating performance of a subloop of sequential link speed recovery commands within each main loop performance, and repeating performance of a main loop of sequential link speed recovery commands in accordance with one embodiment, reliability of link speed recovery to full link speed may be improved. Other aspects and advantages may be realized, depending upon the particular application.

18 Claims, 7 Drawing Sheets

(56) References Cited

OTHER PUBLICATIONS

"PCI Local Bus Specification", PCI-SIG, Rev. 3.0, Feb. 3, 2004, Part 1, pp. 115.
"Root Complex", Wikipedia, [online][retrieved Aug. 29, 2019] https://en.wikipedia.org/wiki/Root_complex, pp. 1.
"Test Happens" Part I, [online][retrieved Aug. 26, 2019] https://blog.teledynelecroy.com/2018/01/an-under-hood-view-of-pci-30-link.html, pp. 3.
"Test Happens" Part II, [online][retrieved Aug. 26, 2019] https://blog.teledynelecroy.com/2018/01/an-under-hood-view-of-pci-30-link.html, pp. 4.
"PCI Local Bus Specification", PCI-SIG, Rev. 3.0, Feb. 3, 2004, Part 2, pp. 115.
"PCI Local Bus Specification", PCI-SIG, Rev. 3.0, Feb. 3, 2004, Part 3, pp. 114.

| Main Loop Sequential Command Set ||
|---|---|
| Main Loop Command Sequence No. | Command |
| ML1 | Initiate Subloop Commands |
| ML2 | Reset-Reinitialize Communication Path Switch |
| ML3 | Reset Upstream Optical Transceiver |
| ML4 | Send OOB signal to Reset Downstream Transceiver at Downstream Port |
| | |

FIG. 7A

| SubLoop Sequential Command Set ||
|---|---|
| SubLoop Command Sequence No. | Command |
| SL1 | Retrain Link at Upstream Port |
| SL2 | Send OOB Signal to Retrain Link at Downstream Port |
| SL3 | Disable-Enable Cycle Upstream Port |
| SL4 | Send OOB Signal to Disable-Enable Cycle Downstream Port |
| | |

FIG. 7B

LINK SPEED RECOVERY IN A DATA STORAGE SYSTEM

BACKGROUND OF THE INVENTION

1. Field of the Invention

The present invention relates to a computer program product, system, and method for link speed recovery in a data storage system.

2. Description of the Related Art

A storage system typically includes a storage controller and one or more data storage devices such as hard disk drives, solid state drives, tape drives, etc. The storage system is often connected to a host which hosts applications which issue input/output instructions or commands for writing data to or reading data from a storage subunit such as a volume, for example.

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Data from a host to be stored in the data storage system is typically directed to a primary data storage device at a local site and then replicated to one or more secondary data storage devices which may be geographically remote from the primary data storage device.

In certain computing environments, a storage area network provides communication paths or channels between multiple host systems and multiple storage control units controlling multiple storage devices e.g., a Direct Access Storage Device (DASD), Redundant Array of Independent Disks (RAID), Just a Bunch of Disks (JBOD), etc. The communication paths through the storage area network typically include switches and communication links which may be formed of fiber optic or other types of cables or may be wireless, for example.

Input/output commands issued by a host are directed through the storage area network to a port of a storage controller. Each port of a storage controller typically has an address or other identification to distinguish it from other ports of the storage area network. In response to I/O commands from a host, the storage controller reads data from or writes data to storage devices which are coupled by communication paths of the storage area network to ports of one or more storage controllers. The communication paths coupling storage controllers and storage devices, like the communication paths coupling host and storage controllers, typically include switches and communication links which may be formed of fiber optic or other types of cables or may be wireless, for example.

The data carrying capacity of a communication path of a storage area network is typically limited by various factors. For example, data carrying paths or channels of the storage area network are frequently designed or configured to support specified data transfer speeds measured in a certain number of data units such as bytes or bits, for example, per second. Accordingly, the data carrying capacity of a particular link is generally limited by the link speed of the communication link.

In a serial bus communication path such as a Peripheral Component Interconnect-Express (PCIe) link or channel, for example, a communication link may have multiple lanes upon which data can travel between an upstream device such as a switch and a downstream device such as an endpoint device. Hence, the link speed of the link is a function of the data transfer rate of a lane and the number of lanes assigned to the link which is negotiated by upstream and downstream controllers of the path in a process often referred to as "training" or "retraining" the link.

For example, when a switch in the form of a PCIe add-in card is plugged into a communication path host (root complex) of a storage controller, upstream and downstream controllers of the link connecting the storage controller to a storage device, exchange "training sequences" to negotiate various link parameters including data transfer rate. This is accomplished through execution of a link training and status state machine (LTSSM) which typically starts the link by establishing a single lane which provides a relatively low data transfer rate. However, as lanes are added by the link training process, the link speed available for data transfer increases until a target link speed referred to herein as "full speed" or "full link speed" is achieved.

Upon conclusion of the training process, data may be transferred at an increased data transfer rate which has been achieved by the training process. However, the link training process may not have achieved the full or target speed for the link. Moreover, even if full speed had been achieved by the link training, data transmission conditions may change causing a renegotiation of link parameters by the communication path which "down trains" the link speed to a lower, less than optimal or target link speed. Also data transmission over some or all of the lanes of the link may be lost due to various factors.

If the link is not operating or is operating at less than full speed, the communication path may again renegotiate link parameters to retrain the link to hopefully achieve or restore full speed. However, it is appreciated that attempts at such training or retraining are frequently unsuccessful at restoring links to full speed.

For example, the PCIe specification provides for a communication path host which is typically a root complex, to initiate link retraining by setting a configuration bit of the PCI Express Capability Link Status Control register of the link upstream or downstream controller. However, if no lanes of the link are currently established, the root complex cannot communicate with the downstream controller via the link to set a configuration bit of the downstream controller. Moreover, setting a configuration bit of the PCI Express Capability Link Status Control register of a link controller is frequently unsuccessful at initiating link retraining which restores full speed to the link.

A known technique to initiate link training is for the root complex to reset or disable-enable a hardware device of a PCIe communication path. For example, an optical transceiver of a PCIe port may be reset or the entire PCIe card providing one or more PCIe ports may be reset. As another example, a PCIe port may be cycled in an enable-disable cycle to initiate training or retraining the communication link. Here too, if no lanes of the link are currently established, the root complex cannot communicate with the downstream controller via the link to reset the downstream component. Moreover, resetting or cycling a PCIe component is frequently unsuccessful at initiating link retraining which restores full speed to the link.

SUMMARY

Link speed recovery in a data storage system in accordance with the present description provides a significant improvement in computer technology. In one aspect, performing link speed recovery to achieve a target link speed on a communication link includes repeating performance of a main loop of sequential link speed recovery commands a predetermined maximum number of times. In addition, each main loop performance of link speed recovery commands includes repeating performance of a subloop of sequential link speed recovery commands within each main loop performance another predetermined maximum number of times.

In one embodiment, execution of a sequential command set for the subloop of sequential link speed recovery commands may be successful more frequently than execution of a sequential command set for the main loop. Hence, repeating the sequential command set for the subloop of sequential link speed recovery commands within each main loop and therefore more frequently than the repetition of the sequential command set for the main loop of sequential link speed recovery commands, can improve the success rate at which link training or retraining results in achievement or recovery of full link speed.

In another aspect, each subloop performance of sequential link speed recovery commands within each main loop performance may optionally include issuing a next-in-sequence link speed recovery command of the subloop set of sequential link speed recovery commands, determining if the target link speed has been achieved after issuing a next-in-sequence link speed recovery command, and terminating performance of link speed recovery if the target link speed has been achieved in response to a next-in-sequence link speed recovery command. In addition, each main loop performance of link speed recovery commands may optionally include after repeating performance of the subloop of link speed recovery commands a predetermined maximum number of times, issuing a next-in-sequence link speed recovery command of the main loop set of sequential link speed recovery commands for the main loop, determining if the target link speed has been achieved after issuing a next-in-sequence link speed recovery command, and terminating performance of link speed recovery if the target link speed has been achieved in response to a next-in-sequence link speed recovery command.

It is appreciated that execution of a particular link speed recovery command may or may not achieve the target link speed. By determining if the target link speed has been achieved after issuing a next-in-sequence link speed recovery command, link speed recovery may be terminated as soon as the target link speed recovery is achieved to improve the efficiency of the link speed recovery.

Conversely, if target link speed recovery is determined to not have been achieved, another next-in-sequence link speed recovery command of a set of sequential link speed recovery commands may be promptly issued to continue the link speed recovery until the target link speed recovery is achieved. Accordingly, in one aspect, each subloop performance of link speed recovery commands may optionally include issuing another next in-sequence link speed recovery command of the subloop set of link speed recovery commands if the target link speed has not been achieved in response to a link speed recovery command of the subloop set, determining if the target link speed as been achieved after issuing another next in-sequence link speed recovery command of the subloop set, and terminating performance of link speed recovery if the target link speed has been achieved in response to another next in-sequence link speed recovery command of the subloop set. In addition, each main loop performance of link speed recovery commands may optionally include issuing another next in-sequence link speed recovery command of the main loop set of link speed recovery commands if the target link speed has not been achieved in response to a link speed recovery command of the main loop set, determining if the target link speed as been achieved after issuing another next in-sequence link speed recovery command of the main loop set, and terminating performance of link speed recovery if the target link speed has been achieved in response to another next-in-sequence link speed recovery command of the main loop set.

In another aspect, each main loop performance of link speed recovery commands may optionally include after repeating performance of the main loop of link speed recovery commands a predetermined maximum number of times, terminating performance of link speed recovery if the target link speed has not been achieved in response to a link speed recovery command. It is appreciated that allocation of computer system resources may be improved by limiting the number of repetitions of main loop performance if full link speed is not achieved within those limitations. However, other techniques may be applied such as replacing defective equipment and repeating link speed recovery as described herein.

In yet another aspect, the subloop set of sequential link speed recovery commands may optionally include at least one of setting a configuration bit of a register at an upstream port coupled to the communication link, sending an out-of-band signal to set a configuration bit of a register of a downstream port coupled to the communication link, initiating a disable-enable cycle of the upstream port and sending an out-of-band signal to initiate a disable-enable cycle of the downstream port. It is appreciated that execution of this sequential command set for the subloop of sequential link speed recovery commands may be successful more frequently than execution of a different sequential command set for the main loop. Hence, repeating this sequential command set for the subloop of sequential link speed recovery commands more frequently than the repetition of the sequential command set for the main loop of sequential link speed recovery commands, can improve the success rate at which link retraining results in recovery of full link speed.

In still another aspect, the main loop set of sequential link speed recovery commands may optionally include at least one of initiating the subloop of sequential link speed recovery commands, initiating a resetting and reinitialization of a communication path switch which includes an upstream port having an upstream optical transceiver coupled to the communication link, resetting the upstream optical transceiver and sending an out-of-band signal to reset a downstream optical transceiver coupled to the communication link. It is appreciated that execution of this sequential command set for the main loop of sequential link speed recovery commands may be successful where execution of a sequential command set for the subloop does not. Hence, although the sequential command set for the main loop of sequential link speed recovery commands may be in some embodiments, performed less frequently than the repetition of the sequential command set for the subloop of sequential link speed recovery commands, the sequential command set for the main loop of sequential link speed recovery commands adds additional recovery commands which provide other avenues for link speed recovery to improve the success rate at which link training or retraining results in achieving or recovery of full link speed.

BRIEF DESCRIPTION OF THE DRAWINGS

FIGS. 7a and 7b illustrate examples sequential command sets for loops of operations of components of the computing environment of FIG. 1, employing link speed recovery in a data storage system in accordance with one aspect of the present description.

DETAILED DESCRIPTION

Figure 1:
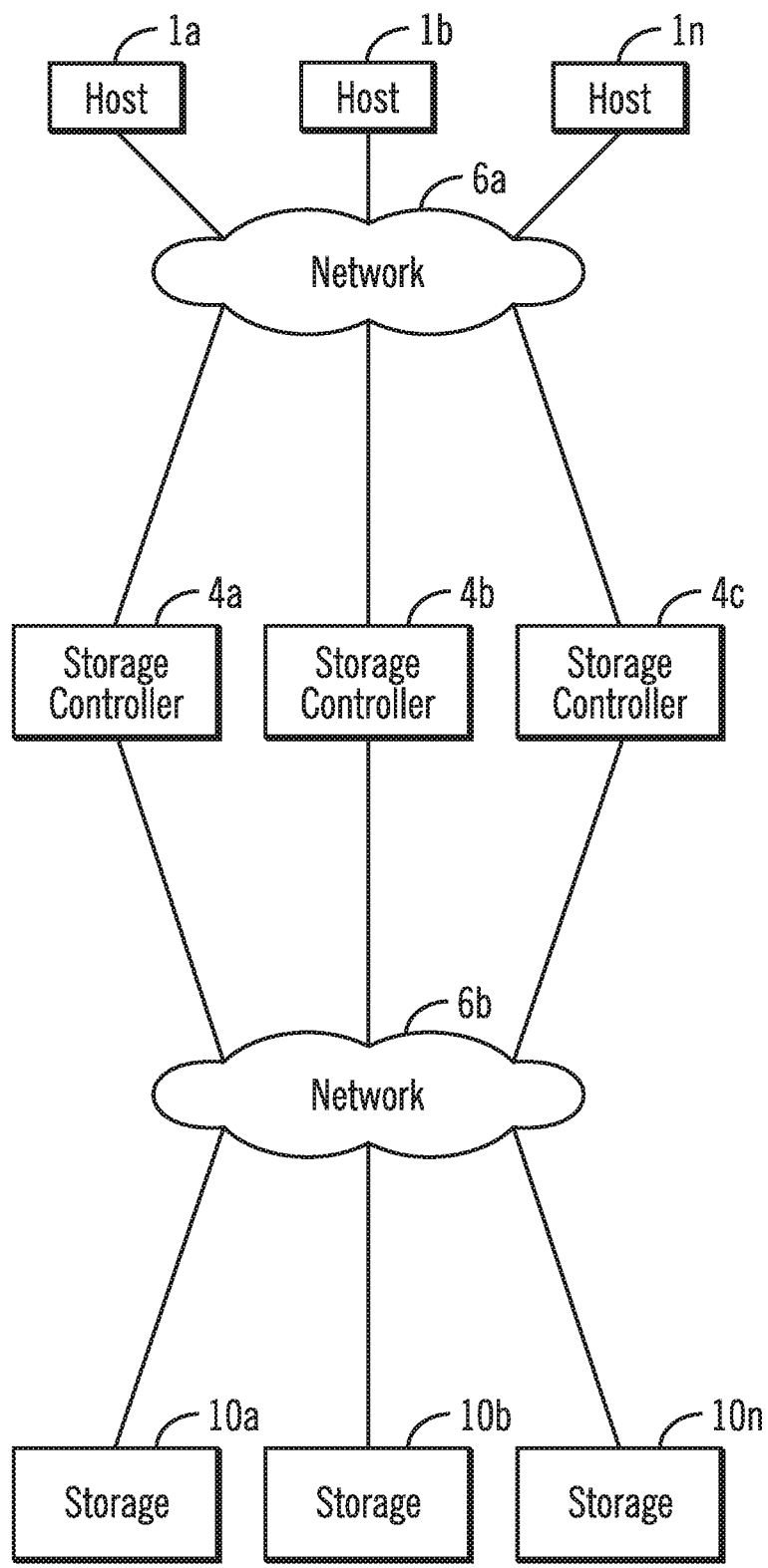
FIG. 1 illustrates an embodiment of a computing environment employing link speed recovery in a data storage system in accordance with one aspect of the present description.

Link speed recovery in a data storage system in accordance with one aspect of the present description provides a significant improvement in computer technology. In one embodiment, the link speed recovery operations are directed to training a communication link of a communication path to acquire or reacquire a target link speed such as full link speed. Accordingly, as used herein, the term "training" a communication link also includes retraining a communication link a subsequent time. For example, link speed recovery in accordance with the present description can facilitate retraining a communication link following a loss of full link speed in which one or more lanes of the communication link were lost. Similarly, link speed recovery in accordance with the present description can facilitate training a communication link to achieve full link speed the first time a communication link is initialized. Accordingly, as used herein, the term "link speed recovery" applies to training or retraining a communication link to achieve a target link speed such as full link speed for the first or a subsequent time.

In one aspect, link speed recovery of the present description includes performing in a main loop, a set of sequential link speed recovery commands. In one embodiment, the main loop and thus the set of sequential link speed recovery commands of the main loop, are repeated as needed. Furthermore, in one embodiment, the main loop includes a subloop of another set of sequential link speed recovery commands which are also repeated as needed. Thus, within the performance of each main loop of one set of sequential link speed recovery commands, a subloop of another set of sequential link speed recovery commands is repeated as needed.

In one aspect of the present description, the set of sequential link speed recovery commands of the subloop are repeated more often than the set of sequential link speed recovery commands of the main loop is repeated. Accordingly, different link speed recovery commands may be assigned to the subloop set as compared to those of the main loop set so as to maximize the effectiveness of the link speed recovery. For example, it is believed that by repeating performance of the subloop set of sequential link speed recovery commands within each main loop performance and repeating performance of the main loop set of sequential link speed recovery commands in accordance with one embodiment, reliability of link speed training or retraining to full link speed may be improved. Accordingly, the success rate at which link training results in recovery of full link speed may also be improved. Other aspects and advantages may be realized, depending upon the particular application.

A system of one or more computers may be configured for link speed recovery in accordance with the present description, by virtue of having software, firmware, hardware, or a combination of them installed on the system that in operation causes or cause the system to perform write transfer resource management in accordance with the present description. For example, one or more computer programs may be configured to perform link speed recovery in a data storage system by virtue of including instructions that, when executed by data processing apparatus such as for example a storage controller processor, cause the apparatus to perform the actions. As used herein, the term "compression" refers to any suitable algorithmic compression process which manipulates data by re-encoding a string of data so that the size of the resultant string of data is reduced in size compared to the original string of data prior to the algorithmic manipulation.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

FIGS. 1-5 illustrate an embodiment of a computing environment employing link speed recovery in a data storage system in accordance with the present description. In this example, a plurality of hosts 1a, 1b . . . 1n may submit Input/Output (I/O) requests to one or more storage controllers 4a, 4b . . . 4n over a network 6a to access data stored in storage 10a, 10b . . . 10n by the storage controllers 4a, 4b . . . 4n over a network 6b. Each storage controller and the storage controlled by the storage controller over the network 6b form a data storage system. The hosts 1a, 1b . . . 1n may be separate physical devices or may be virtual devices implemented using assigned resources of partitions of a server, for example. In a similar manner, the storage controllers 4a, 4b . . . 4n may be separate physical devices or may be virtual devices implemented using assigned resources of partitions one or more servers, for example.

Figure 2:
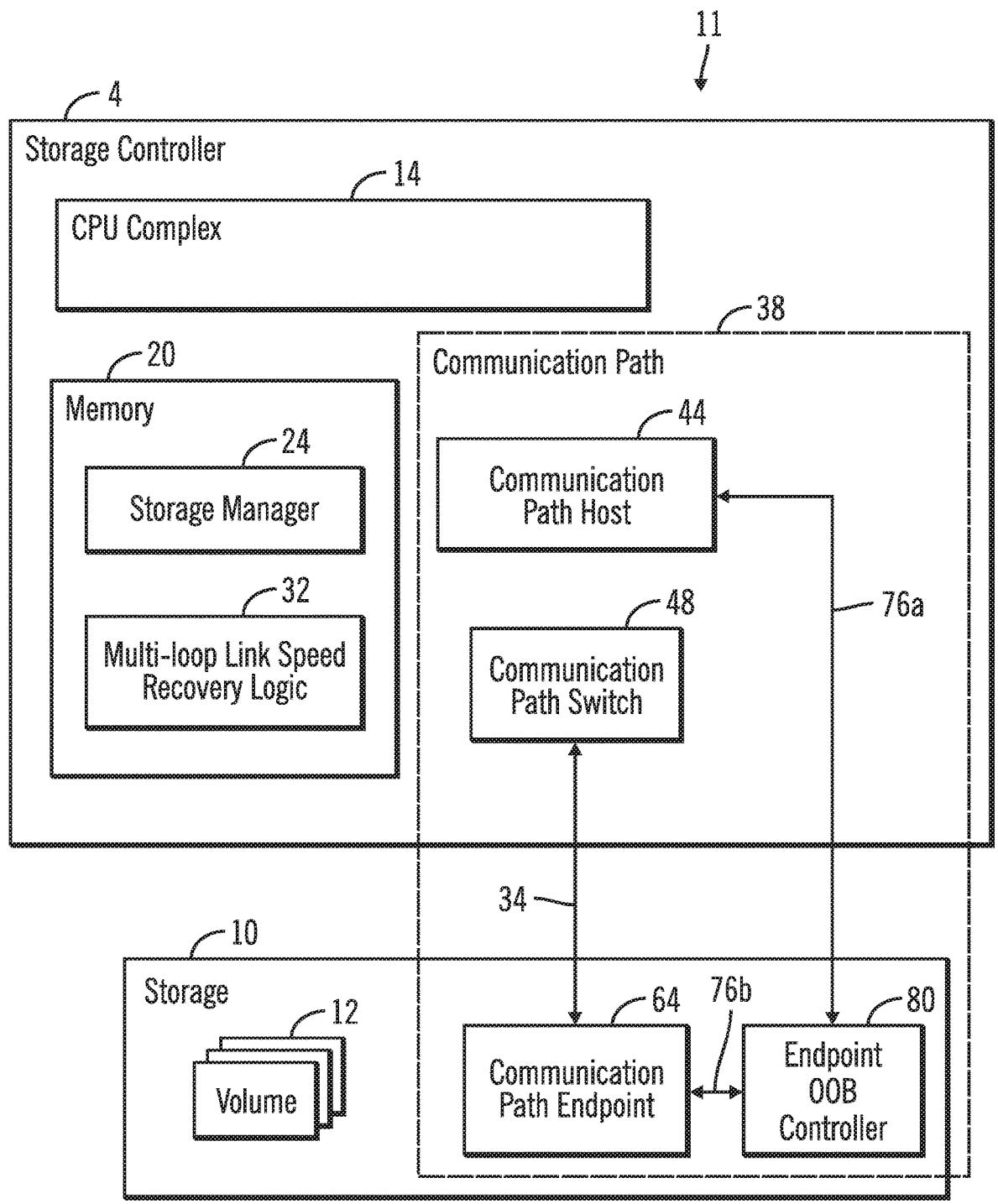
FIG. 2 illustrates an example of a data storage system including a storage controller and storage unit of the computing environment of FIG. 1, employing link speed recovery in a data storage system in accordance with one aspect of the present description.
Figure 3:
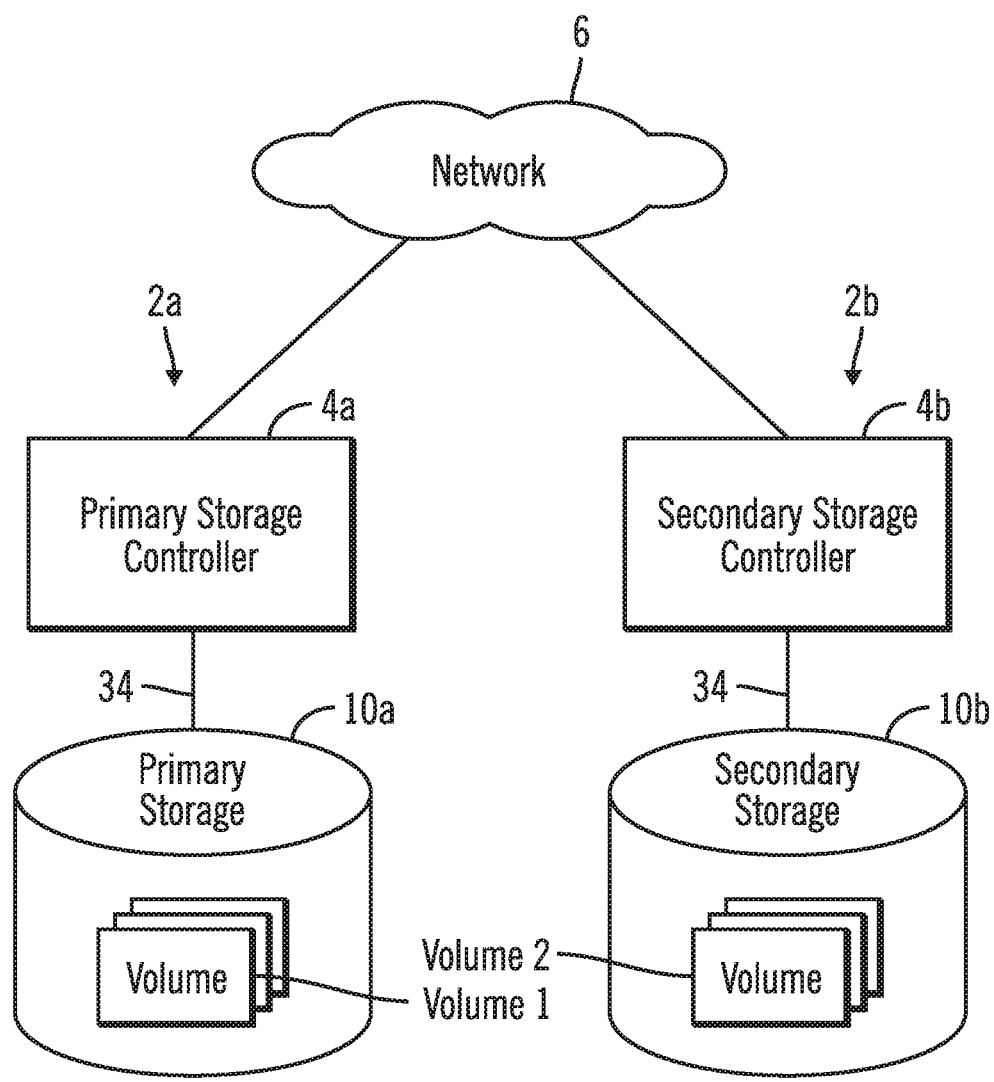
FIG. 3 illustrates an example of a primary and secondary data storage system including storage controllers of the computing environment of FIG. 1, employing link speed recovery in a data storage system in accordance with one aspect of the present description.

FIG. 2 shows in greater detail an example of a data storage system 11 employing link speed recovery in accordance with the present description. The data storage system 11 is similar to and representative of the data storage systems of FIG. 1 which include the storage controllers 4a, 4b . . . 4n and storage 10a, 10b . . . 10n. FIG. 3 illustrates an example of a storage system having a primary data storage system 11a and a secondary data storage system 11b, in which one or both of the primary or secondary storage systems employ link speed recovery in accordance with one aspect of the present description.

Each data storage system 11 (FIG. 2), 11a, 11b (FIG. 3) includes a storage controller or control unit 4 (FIG. 2), 4a (FIG. 3), 4b which accesses data at volumes 12 (FIG. 2), volume1, volume2 (FIG. 3) (e.g., LUNs (Logical Units), Logical Devices, Logical Subsystems, etc.) in storage represented by one or more storage drives 10 (FIG. 2), 10a, (FIG. 3), 10b (FIG. 3). Each storage controller 4, 4a, 4b includes a CPU complex 14 (FIG. 2), including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a (FIG. 3), 4b further has a memory 20 (FIG. 2) that includes a storage manager 24 for managing storage operations including writing data to or reading data from an associated storage 10, 10a (FIG. 3), 10b, respectively, in response to an I/O data request from a host. The storage operations managed by the storage manager 24 further include data replication operations from a primary volume1 (FIG. 3) of a primary data storage system such as the data storage system 11a, for example, to a secondary volume2 at a secondary data storage system such as the data storage system 11b, for example. The storage manager 24 is configured to generate copies of the primary volume1 (FIG. 3) of the primary data storage system 11a as a secondary volume2 (FIG. 3) of the secondary data storage system 11b. The pair of volumes, volume1, volume2 are in a copy relationship such that updates to the primary volume1 are replicated to the secondary volume2.

The CPU complex 14 of each storage controller may have multiple clusters of processors, each cluster having its own assigned memory 20, storage manager 24, cache, etc. The processing and memory resources assigned each cluster may be physical, virtual, shared, transferable or dedicated, depending upon the particular application.

As described in greater detail below, multi-loop link speed recovery logic 32 of the storage manager 24 facilitates, in one embodiment, successful training of a communication link such as the link 38 of the network 6b (FIG. 1) coupling the storage controller 4 to storage 10. As a result, the link 34 which is part of a communication path 38 coupling the storage controller 4 to storage 10, may be reliably trained or retrained to establish or restore full link speed and thereby improve efficiency of computer operations of the data storage system 11. Other aspects and advantages may be realized, depending upon the particular application.

Figure 4:
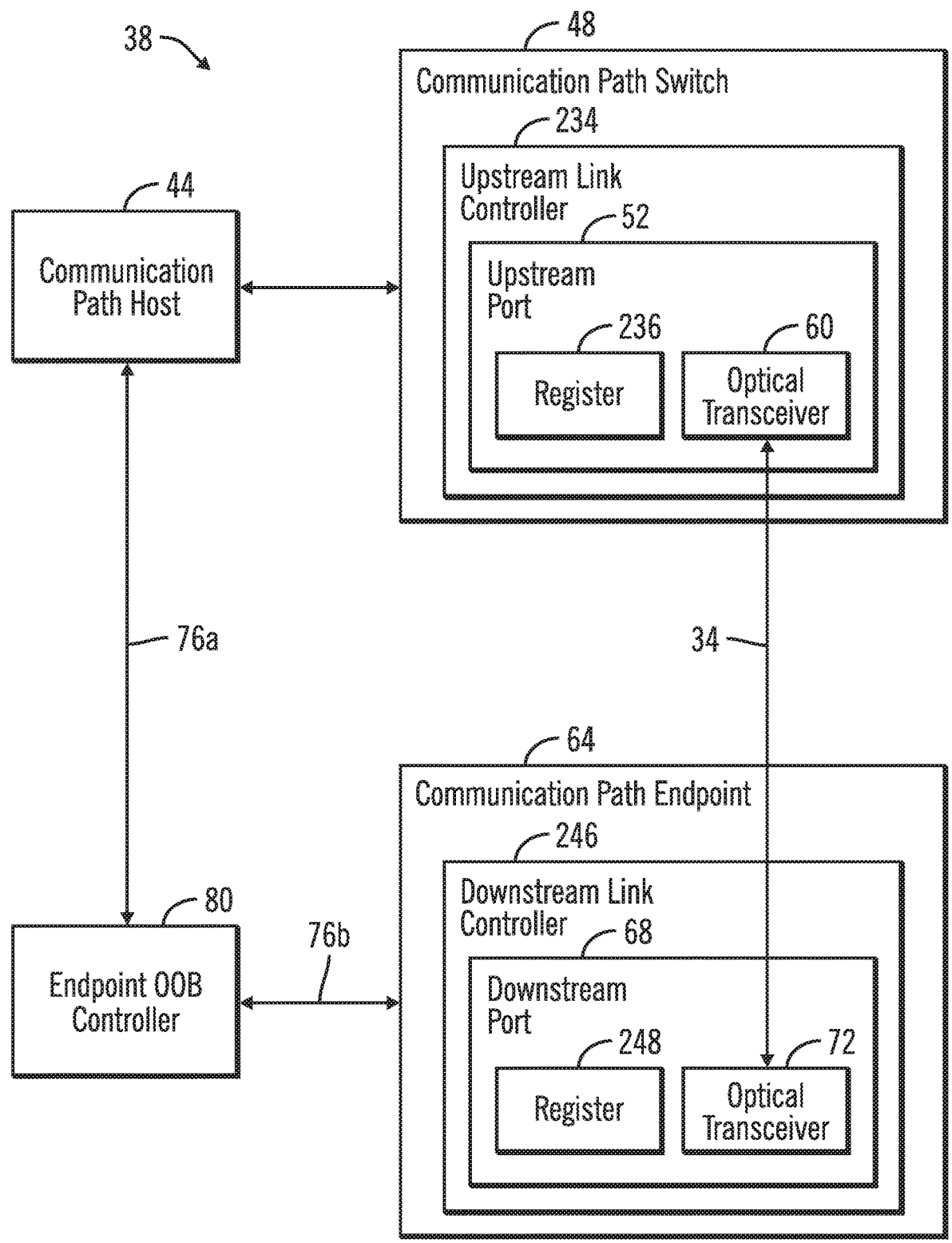
FIG. 4 illustrates an example of a communication path of the computing environment of FIG. 1, employing link speed recovery in a data storage system in accordance with one aspect of the present description.

In the illustrated embodiment as shown in FIGS. 2 and 4, the communication path 38 is a PCIe communication path which includes a communication path host 44 which may be implemented with a root complex. The communication path 38 (FIGS. 2, 4) further includes a communication path switch 48 which has a plurality of upstream input/output ports, an example of which is depicted as the upstream I/O port 52 (FIG. 4) having an upstream optical transceiver 60. In one embodiment, the communication path switch 48 may be implemented as a removable add-in card having a substrate supporting integrated circuit devices of the communication path switch 48. Connectors disposed on the PCIe card of the communication path switch 48 permit the communication path switch 48 to be removably coupled to the communication path host 44 of the communication path 38.

The communication link 34 includes one or more fiber optic cables optically coupled to an optical transceiver 60 of the upstream port 52. Although the link 34 is described as a fiber optic link in the illustrated embodiment, it is appreciated that the link 34 may employ other data transmission technologies such as conductive metal cables, wireless transmission, etc. Moreover, although the communication path 38 is depicted as providing a PCIe serial bus communication path, it is appreciated that a communication path employing link speed recovery in accordance with the present description may employ other communication protocols and technologies such as other types of serial busses, parallel busses, etc.

The communication path 38 further includes an endpoint device 64 which may have a plurality of downstream ports, an example of which is depicted as the downstream port 68 having an optical transceiver 72. The communication link 34 is coupled at one end to the optical transceiver 60 of the upstream port 52 of the switch 48, and is coupled at another end to the optical transceiver 72 of the downstream port 68 of the end point device 64 of a storage device 10 in this embodiment.

Although the communication path 38 is depicted as providing a communication path between a storage controller 4 and a storage 10, it is appreciated that a communication path employing link speed recovery in accordance with the present description may be employed for communication between other types of devices. For example, a communication path employing link speed recovery in accordance with the present description may provide communication between a host such as a host 1a, and a storage controller 4, for example. Other devices that utilize a communication path may benefit as well by employing link speed recovery in accordance with the present description, depending upon the particular application.

In the illustrated embodiment, the multi-loop link speed recovery logic 32 of the storage controller 4, is depicted as software stored in the memory 20 and executed by the CPU complex 14. However, it is appreciated that the logic functions of the multi-loop link speed recovery logic 32 may be implemented as hardware, software, firmware or any combination of one or more thereof, depending upon the particular application. For example, logic functions of the multi-loop link speed recovery logic 32 may be implemented in a driver for a communication path such as a PCIe communication path 38 and may also be implemented in hardware, software, firmware or any combination of one or more thereof, of the communication path 38 itself in addition to or instead of the driver for the communication path.

In another aspect of link speed recovery in accordance with the present description, the communication path 38 includes out-of-band (OOB) subpaths 76a, 76b and an endpoint out-of-band controller 80, which provide a subsidiary communication path between the communication path host 44 and the endpoint device 64. In one embodiment, the out-of-band (OOB) subpaths 76a, 76b may conform to the RS 485 serial protocol instead of the PCIe protocol. Other protocols may be used, depending upon the particular application. As described in greater detail below, the out-of-band subpaths 76a, 76b and the out-of-band controller 80 permit communication between the communication path host 44 such as a root complex, and the components of the endpoint device 64, independently of the communication link 34. For example, if the communication link 34 lacks any operational lane of communication, communication may nevertheless be provided by the out-of-band subpaths 76a, 76b and the out-of-band controller 80 to initiate link speed recovery at the communication endpoint device 64 as described in greater detail below. In the illustrated embodiment, the communication path host 44 is coupled by the out-of-band subpath 76a to the out-of-band controller 80 which is in turn coupled to the endpoint device 64 by the out-of-band subpath 76b to permit out-of-band communication between the communication path host 44 and the components of the endpoint device 64.

In one embodiment, the storage or storage drives 10 (FIG. 2), 10a, 10b . . . 10n (FIG. 1) may be comprised of in addition to a communication path endpoint device 64, one or more sequential access storage devices, such as hard disk drives and magnetic tape or may include non-sequential access storage devices such as solid state drives (SSD), for example. Each storage drive 10, 10a, 10b . . . 10n may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The storage units of the storage drives 10, 10a, 10b . . . 10n may be configured to store data in subunits of data storage such as volumes, tracks, extents, blocks, pages, segments, cylinders, etc. Although link speed recovery in accordance with the present description is described in connection with storage subunits such as volumes, it is appreciated that link speed recovery in accordance with the present description is applicable to other storage subunits such as tracks, extents, blocks, pages, segments, cylinders, etc.

The system components 1a, 1b . . . 1n, 4, 4a, 4b, . . . 4n, 10, 10a, 10b . . . 10n are connected to the networks 6a, 6b which enables communication among these components via switches, links, and endpoint devices such as adapters. Thus, the networks 6a, 6b include in one embodiment, a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage systems to the hosts 1a, 1b, . . . 1n and from the storage controllers 4, 4a, 4b, 4n to the storage 10, 10a, 10b . . . 10n may be based upon various attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 5:
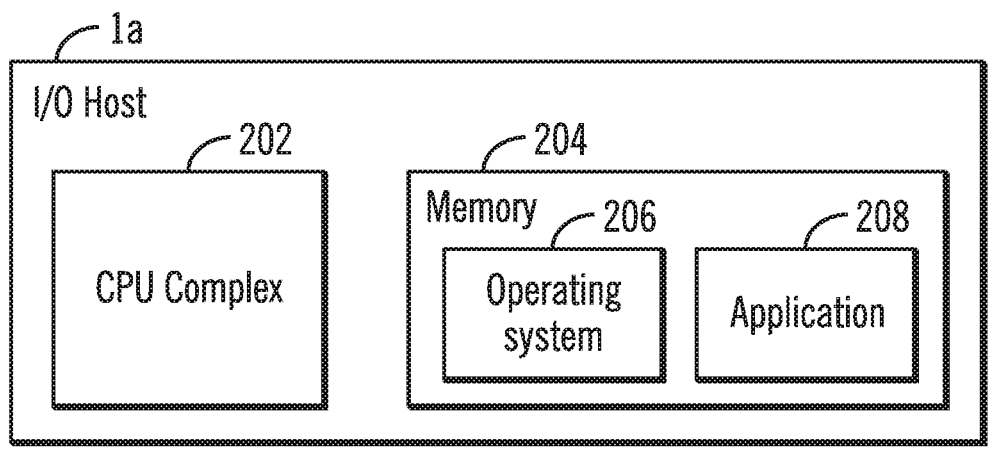
FIG. 5 illustrates an example of a host of the computing environment of FIG. 1, employing link speed recovery in a data storage system in accordance with one aspect of the present description.

A typical host as represented by the host 1a of FIG. 5 includes a CPU complex 202 and a memory 204 having an operating system 206 and an application 208 that cooperate to read data from and write data updates to the primary storage 10a (FIG. 3) or secondary storage 10b via a storage controller 4, 4a, 4b . . . 4n. An example of a suitable operating system is the z/OS operating system. It is appreciated that other types of operating systems may be employed, depending upon the particular application.

Link speed recovery in accordance with the present description, may be applied to any computer system having communication links, utilizing logic as represented by the multi-loop link speed recovery logic 32 (FIG. 2). Thus, each host such as the host 1a, for example, may also employ multi-loop link speed recovery logic for link speed recovery.

The hosts 1a, 1b . . . 1n, the storage controllers 4, 4a, 4b, storage devices 10, 10a, 10b, communication path 38 and the multi-loop link speed recovery logic 32 may each be implemented using any computational device which has been modified for link speed recovery in accordance with the present description. Computational devices suitable for modification as described herein include those presently known in the art, such as, a personal computer, a workstation, a server, a mainframe, a hand held computer, a palm top computer, a telephony device, a network appliance, a blade computer, a processing device, etc. The hosts 1a, 1b . . . 1n, the storage controllers 4, 4a, 4b . . . 4n, storage devices 10, 10a, 10b . . . 10n, communication path 38, and the multi-loop link speed recovery logic 32 may be elements in any suitable network, such as, a storage area network, a wide area network, the Internet, an intranet, or elements in a cloud computing environment.

Figure 6:
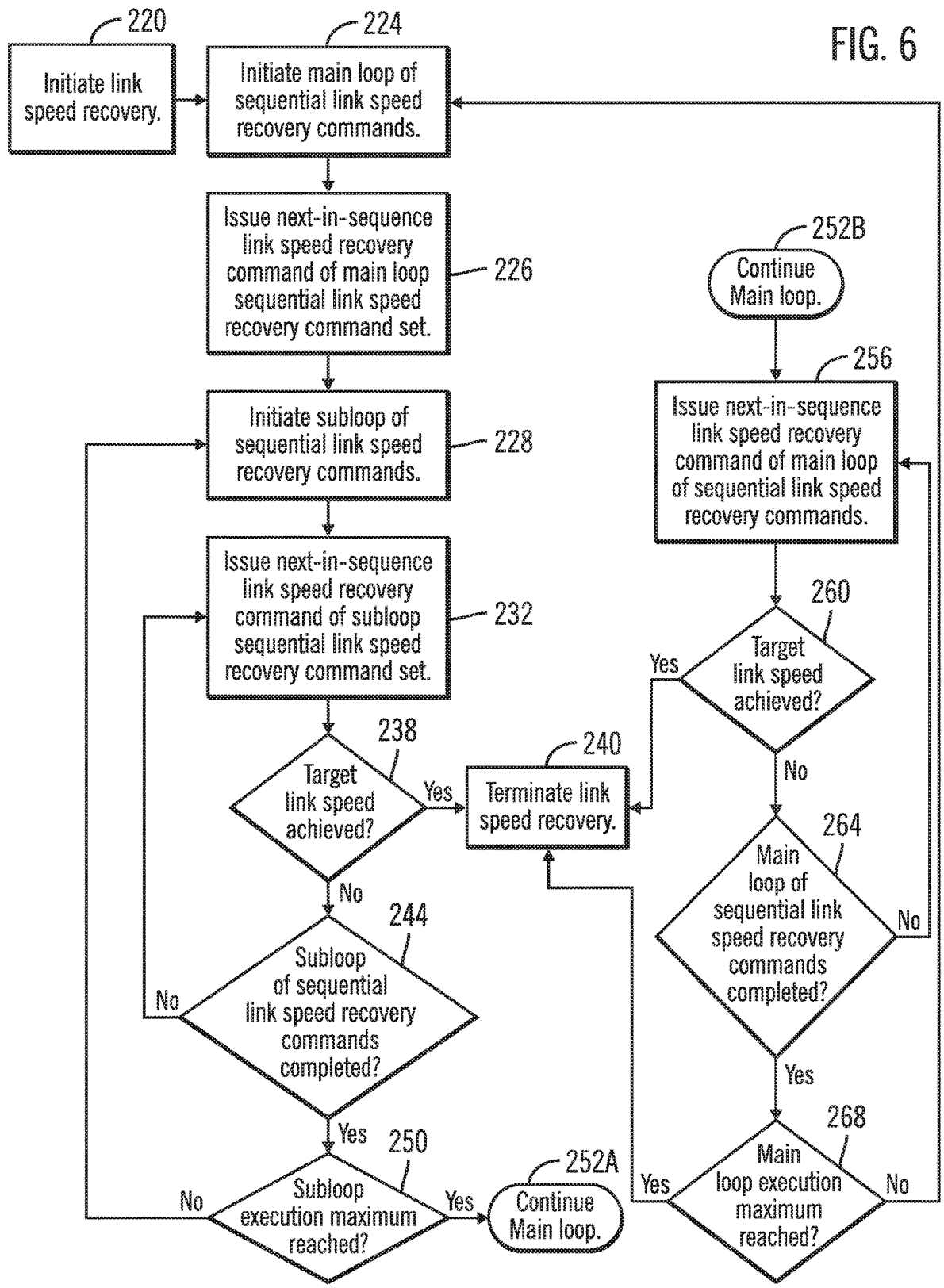
FIG. 6 illustrates an example of operations of components of the computing environment of FIG. 1, employing link speed recovery in a data storage system in accordance with one aspect of the present description.

FIG. 6 depicts one embodiment of operations of the multi-loop link speed recovery logic 32 (FIG. 2) of the storage controller 4 in connection with the communication path 38 (FIG. 4). In this example, logic elements of the multi-loop link speed recovery logic 32 (FIG. 2) and the communication path 38 (FIG. 4) are configured to perform link speed recovery as depicted in FIG. 6 and the accompanying description herein.

In one example, the link speed recovery operations are directed to retraining the communication link 34 of the communication path 38 to reacquire a link speed such as full link speed, on the communication link 34 following a loss of full link speed in which one or more lanes of the communication link 34 was lost. As explained in greater detail below, the link speed recovery of this embodiment includes repeating performance of a main loop of sequential link speed recovery commands a predetermined maximum number of times. FIG. 7a shows an example of sequential command set for the main loop of sequential link speed recovery commands. It is appreciated that other sequences, types or quantities of link speed recovery commands and operations may be employed in a main loop in addition to or instead of those depicted in FIG. 7a, depending upon the particular application. It is further appreciated that the number of different main loops of link speed recovery commands and operations may vary, depending upon the particular application. In this embodiment, each main loop performance of link speed recovery commands includes repeating performance of a subloop of sequential link speed recovery commands within each main loop performance a second predetermined maximum number of times.

FIG. 7b shows an example of a sequential command set for the subloop of sequential link speed recovery commands. It is believed that separating sequential link speed recovery commands into different sets can improve reliability of link speed recovery. For example, it is believed that by repeating performance of a subloop of sequential link speed recovery commands within each main loop performance, and repeating performance of a main loop of sequential link speed recovery commands in accordance with one embodiment, reliability of link speed recovery to full link speed may be improved. Thus, in one embodiment, the sequential command set for the subloop of sequential link speed recovery commands are repeated more frequently than the sequential command set for the main loop of sequential link speed recovery commands. Such an arrangement can improve the success rate at which link retraining results in recovery of full link speed. For example, execution of the sequential command set for the subloop of sequential link speed recovery commands may be successful more frequently than execution of the sequential command set for the main loop. Hence, repeating the sequential command set for the subloop of sequential link speed recovery commands more frequently than the repetition of the sequential command set for the main loop of sequential link speed recovery commands, can improve the success rate at which link retraining results in recovery of full link speed. It is appreciated that other sequences, types or quantities of link speed recovery commands and operations may be employed in a subloop in addition to or instead of those depicted in FIG. 7b, depending upon the particular application. It is further appreciated that the number of different subloops of link speed recovery commands and operations may vary, depending upon the particular application.

The multi-loop link speed recovery logic 32 (FIG. 2) of the storage controller 4 in response to loss of full link speed, initiates (block 220, FIG. 6) link speed recovery to train the communication link 34 of the communication path 38. The main loop of sequential link speed recovery commands is initiated (block 224, FIG. 6) first in the link speed recovery of FIG. 6, and the next-in-sequence link speed recovery command of the main loop sequential command set (FIG. 7a) is issued (block 226, FIG. 6). In this example, the next-in-sequence main loop sequential command of the sequence ML1-ML4 of main loop commands, is the first main loop command ML1 of the main loop sequential command set. As shown in FIG. 7a, the next-in-sequence main loop command ML1 initiates (block 228, FIG. 6) the subloop of sequential link speed recovery commands SL1-SL4 depicted in FIG. 7b, and the next-in-sequence link speed recovery command of the subloop sequential command set (FIG. 7b) is issued (block 232, FIG. 6).

In this example, the next-in-sequence subloop sequential command of the sequence SL1-SL4 of subloop commands, is the first subloop command SL1 of the subloop sequential command set. As shown in FIG. 7b, the next-in-sequence subloop command SL1 commands the communication link 34 (FIG. 4) to be retrained (or trained) at the upstream port 52. In this embodiment, the communication path switch 48 includes an upstream link controller 234 which in response to commands from the communication path host 44, controls the upstream port 52. Accordingly, the multi-loop link speed recovery logic 32 (FIG. 2) of the storage controller 4 issues suitable commands to the communication path host 44 which is a root complex in this example, and the communication path host 44 issues suitable commands to the communication path switch 48 and its upstream port 52 to initiate retraining (or training) the communication link 34 coupled to the upstream port 52.

In this embodiment, retraining (or training) the communication link 34 may be initiated by setting a bit of a register 236 of the upstream port 52. For example, the PCIe specification provides for a root complex to initiate link retraining by setting a configuration bit of the PCI Express Capability Link Status Control register. Thus, in one embodiment, the register 236 of the upstream port 52 may be a PCI Express Capability Link Status Control register. It is appreciated that the register 236 may have other formats, depending upon the particular protocol of the communication link 34.

It is appreciated herein that a single setting of a bit of a register 236 of the upstream port 52 may not achieve a successful retraining of the communication link 34. Accordingly, the multi-loop link speed recovery logic 32 (FIG. 2) of the storage controller 4 following the setting of the register bit which initiates the communication link retraining, and after a suitable delay to allow the retraining to complete, determines (block 238, FIG. 6) whether the target link speed such as full link speed, for example, has been achieved by the communication link retraining (or training) which was initiated at the upstream port 52. In one embodiment, the link speed of the communication link may be determined by polling the status of the communication link 34. If full link speed was restored (or achieved) for the communication link 34, link speed recovery is terminated (block 240, FIG. 6)

Conversely, if it is determined (block 238, FIG. 6) that link speed retraining initiated at the upstream port 52 by the setting of the appropriate configuration bit of the register 236 failed to achieve the targeted full link speed for the communication link 34, the multi-loop link speed recovery logic 32 (FIG. 2) of the storage controller 4 determines (block 244) whether all the sequential link speed recover commands of the subloop sequential command set (FIG. 7b) have been completed.

In this example, all the sequential link speed recovery commands of the subloop sequential command set (FIG. 7*b*) have not been completed. Accordingly, the next-in-sequence link speed recovery command of the subloop sequential command set (FIG. 7*b*) is issued (block 232, FIG. 6). In this example, the next-in-sequence subloop sequential command of the sequence SL1-SL4 of subloop commands, is the second subloop command SL2 of the subloop sequential command set. As shown in FIG. 7*b*, the next-in-sequence subloop command SL2 commands the communication link 34 (FIG. 4) to be retrained (or trained) at the downstream port 68. In this embodiment, the communication path endpoint 64 includes a downstream link controller 246 which in response to commands from the communication path host 44, controls the downstream port 68.

In one aspect of link speed recovery in accordance with the present description, the out-of-band subpath 76*a* provides a subsidiary communication path between the communication path host (root complex) 44 and the endpoint out-of-band controller 80 which in turn is coupled by the subsidiary out-of-band communication path 76*b* to the communication path endpoint device 64. The out-of-band subpaths 76*a*, 76*b* and controller 80 permit communication between the communication path host 44 and the downstream link controller 246 of the endpoint device 64, independently of the communication link 34. For example, if the communication link 34 has lost all (or not established any) lanes of communication due to, for example, failure of the retraining (or training) at the upstream port described above to establish or restore lanes of communication for the communication link 34, communication between the communication path host 44 and the downstream link controller 246 may nevertheless be provided by the out-of-band subpaths 76*a*, 76*b* and the endpoint out-of-band controller 80. Accordingly, the multi-loop link speed recovery logic 32 (FIG. 2) of the storage controller 4 issues suitable commands to the communication path host 44 which is a root complex in this example, and in response, the communication path host 44 issues suitable commands to the communication path endpoint 64 and its downstream port 68 via the endpoint out-of-band controller 80 and the out-of-band subpaths 76*a*, 76*b* to initiate retraining the communication link 34 coupled to the downstream port 68.

Here too, in this embodiment, retraining or training the communication link 34 may be initiated by setting a bit of a register 248 of the downstream port 68. As noted above, the PCIe specification provides for a root complex to initiate link retraining by setting a configuration bit of the PCI Express Capability Link Status Control register. Thus, in one embodiment, the register 248 of the downstream port 68 may be a PCI Express Capability Link Status Control register. It is appreciated that the register 248 may have other formats, depending upon the particular protocol of the communication link 34.

It is appreciated herein that a single setting of a bit of a register 248 of the downstream port 68 may not achieve a successful retraining or training of the communication link 34. Accordingly, the multi-loop link speed recovery logic 32 (FIG. 2) of the storage controller 4 following the setting of the register bit which initiates the communication link retraining at the downstream port and after a suitable delay to allow the retraining to complete, determines (block 238, FIG. 6) whether the desired link speed such as full link speed, for example, has been achieved by the communication link retraining which was initiated at the downstream port 68. In one embodiment, the link speed of the communication link may be determined by polling the status of the communication link 34. If full link speed was restored for the communication link 34, link speed recovery is terminated (block 240, FIG. 6)

Conversely, if it is determined (block 238, FIG. 6) that link speed retraining initiated at the downstream port 68 by the setting of the appropriate configuration bit of the register 248 failed to achieve the targeted full link speed for the communication link 34, the multi-loop link speed recovery logic 32 (FIG. 2) of the storage controller 4 again determines (block 244) whether all the sequential link speed recover commands of the subloop sequential command set (FIG. 7*b*) have been completed.

In this example, all the sequential link speed recover commands of the subloop sequential command set (FIG. 7*b*) have not been completed. Accordingly, the next-in-sequence link speed recovery command of the subloop sequential command set (FIG. 7*b*) is issued (block 232, FIG. 6). In this example, the next-in-sequence subloop sequential command of the sequence SL1-SL4 of subloop commands, is the third subloop command SL3 of the subloop sequential command set. As shown in FIG. 7*b*, the next-in-sequence subloop command SL3 commands the communication link 34 (FIG. 4) to be retrained or trained at the upstream port 52 by initiating a disable-enable cycle at the upstream port 52. Accordingly, the multi-loop link speed recovery logic 32 (FIG. 2) of the storage controller 4 issues suitable commands to the communication path host 44 which is a root complex in this example, and in response, the communication path host 44 issues suitable commands to the communication path switch 48 and its upstream port 52 to initiate a disable-enable cycle at the upstream port 52 to initiate retraining or training the communication link 34 coupled to the upstream port 52. In this embodiment, training or retraining the communication link 34 may be initiated by disabling the upstream port, waiting a suitable duration of time and then enabling the upstream port in a disable-enable cycle. For example, a wait in the range of 50 microseconds to one millisecond, such as 100 microseconds, may be appropriate, depending upon the particular application It is appreciated herein that a single disable-enable cycling of the upstream port 52 may not achieve a successful training or retraining of the communication link 34. Accordingly, the multi-loop link speed recovery logic 32 (FIG. 2) of the storage controller 4 following the disable-enable cycle, and a suitable delay to allow the disable-enable cycle initiated retraining to complete, determines (block 238, FIG. 6) whether the targeted link speed such as full link speed, for example, has been restored by the communication link retraining which was initiated at the upstream port 52. If full link speed was restored for the communication link 34, link speed recovery is terminated (block 240, FIG. 6)

Conversely, if it is determined (block 238, FIG. 6) that link speed retraining initiated at the upstream port 52 by the disable-enable cycling of the upstream port 52 failed to achieve full link speed for the communication link 34, the multi-loop link speed recovery logic 32 (FIG. 2) of the storage controller 4 determines (block 244) again whether all the sequential link speed recover commands of the subloop sequential command set (FIG. 7*b*) have been completed.

In this example, all the sequential link speed recover commands of the subloop sequential command set (FIG. 7*b*) have not been completed. Accordingly, the next-in-sequence link speed recovery command of the subloop sequential command set (FIG. 7*b*) is issued (block 232, FIG. 6). In this example, the next-in-sequence subloop sequential command of the sequence SL1-SL4 of subloop commands, is the fourth subloop command SL4 of the subloop sequential command set. As shown in FIG. 7b, the next-in-sequence subloop command SL4 commands the communication link 34 (FIG. 4) to be retrained or trained at the downstream port 68 by initiating a disable-enable cycle at the downstream port 68. Accordingly, the multi-loop link speed recovery logic 32 (FIG. 2) of the storage controller 4 issues suitable commands to the communication path host 44 which is a root complex in this example, and in response, the communication path host 44 issues suitable commands to the communication path endpoint device 64 and its downstream port 68 via the out-of-band subpath 76a, the endpoint out-of-band controller 80 and the out-of-band subpath 76b, to initiate a disable-enable cycle at the downstream port 68 to initiate retraining the communication link 34 coupled to the downstream port 68.

In this embodiment, training or retraining the communication link 34 may be initiated by disabling the downstream port, waiting a suitable duration of time and then enabling the downstream port in a disable-enable cycle. For example, a wait in the range of 50 microseconds to one millisecond, such as 100 microseconds, may be appropriate, depending upon the particular application. It is appreciated herein that a single disable-enable cycling of the downstream port 68 may not achieve a successful training or retraining of the communication link 34. Accordingly, the multi-loop link speed recovery logic 32 (FIG. 2) of the storage controller 4 after initiating the disable-enable cycle, and after a suitable delay to allow the disable-enable cycle initiated training or retraining to complete, follows the disable-enable cycle with a determination (block 238, FIG. 6) of whether the targeted link speed such as full link speed, for example, has been achieved by the communication link training or retraining which was initiated at the downstream port 68. If full link speed was restored for the communication link 34, link speed recovery is terminated (block 240, FIG. 6)

Conversely, if it is determined (block 238, FIG. 6) that link speed retraining initiated at the downstream port 68 by the disable-enable cycling of the downstream port 68 failed to achieve full link speed for the communication link 34, the multi-loop link speed recovery logic 32 (FIG. 2) of the storage controller 4 again determines (block 244) whether all the sequential link speed recover commands of the subloop sequential command set (FIG. 7b) have been completed.

In this example, all the sequential link speed recover commands SL1-SL4 of the subloop sequential command set (FIG. 7b) have been completed as described above. Accordingly, the multi-loop link speed recovery logic 32 (FIG. 2) of the storage controller 4 determines (block 250, FIG. 6) whether a subloop execution maximum has been reached. In one embodiment, the execution of the subloop of sequential link speed recovery commands SL1-SL4 is repeated within each main loop up to a maximum as represented by a variable "S" which may be 5 times, for example. It is appreciated that other maxima may be selected such as in a range of 5-10, for example, depending upon the particular application. If it is determined (block 250, FIG. 6) that repetition of the subloop execution of sequential link speed recovery commands SL1-SL4 within the main loop has not reached the maximum S, the subloop execution of sequential link speed recovery commands SL1-SL4 is repeated at blocks 228-244 as described above until the maximum S is reached. Once it is determined (block 250, FIG. 6) that repetition of the subloop execution of sequential link speed recovery commands SL1-SL4 has reached the maximum S within the main loop, the main loop execution of sequential link speed recovery commands ML1-ML4 is continued (blocks 252A, 252B).

Accordingly, the next-in-sequence link speed recovery command of the main loop sequential command set (FIG. 7a) is issued (block 256, FIG. 6). In this example, the next-in-sequence main loop sequential command of the sequence ML1-ML4 of main loop commands, is the second main loop command ML2 of the main loop sequential command set. As shown in FIG. 7a, the next-in-sequence main loop command ML2 commands the communication path switch 48 to be reset and then its configuration to be reinitialized.

Accordingly, the multi-loop link speed recovery logic 32 (FIG. 2) of the storage controller 4 issues suitable commands to the communication path host 44 which is a root complex in this example, and in response, the communication path host 44 issues suitable commands to the communication path switch 48 to reset and then reinitialize its configuration to initiate retraining or training the communication link 34 coupled to the upstream port 52.

In one embodiment, the reset of the communication path switch 48 is a fundamental reset which resets all the configuration bits of the configuration registers of the communication path switch 48 to their default values. Accordingly, the reset bits are reinitialized following the fundamental reset as appropriate. It is appreciated that other types of resets may be performed such as a hard reset or a soft reset in which various levels of register bits are reset and then reinitialized.

In response to the resetting and then reinitializing the communication path switch, it is known that training of the communication link 34 is automatically initiated. However, in one aspect of link speed recovery in accordance with the present description, it is recognized that resetting and then reinitializing the communication path switch 48 may not achieve a successful training or retraining of the communication link 34. Accordingly, the multi-loop link speed recovery logic 32 (FIG. 2) of the storage controller 4 following the resetting and then reinitializing the communication path switch 48, determines (block 260, FIG. 6) after a suitable delay, whether the target link speed such as full link speed, for example, has been achieved by the communication link retraining or training which was initiated at the upstream port 52. In one embodiment, the link speed of the communication link may be determined by polling the status of the communication link 34. If full link speed was restored for the communication link 34, link speed recovery is terminated (block 240, FIG. 6).

Conversely, if it is determined (block 260, FIG. 6) that link speed training or retraining initiated at the upstream port 52 by the resetting and then reinitializing the communication path switch 48 failed to achieve full link speed for the communication link 34, the multi-loop link speed recovery logic 32 (FIG. 2) of the storage controller 4 determines (block 264) whether all the sequential link speed recover commands of the main loop sequential command set (FIG. 7a) have been completed.

In this example, all the sequential link speed recover commands of the main loop sequential command set (FIG. 7a) have not been completed. Accordingly, the next-in-sequence link speed recovery command of the main loop sequential command set (FIG. 7a) is issued (block 256, FIG. 6). In this example, the next-in-sequence main loop sequential command of the sequence ML1-ML4 of main loop commands, is the third main loop command ML3 of the main loop sequential command set. As shown in FIG. 7a, the next-in-sequence main loop command ML3 commands the optical transceiver 60 of the upstream port 52 to be reset and to reboot.

Accordingly, the multi-loop link speed recovery logic 32 (FIG. 2) of the storage controller 4 issues suitable commands to the communication path host 44 which is a root complex in this example, and in response, the communication path host 44 issues suitable commands to the communication path switch 48 to reset the optical transceiver 60 of the upstream port 52 to initiate retraining the communication link 34 coupled to the upstream port 52.

In response to the resetting of the optical transceiver 60 of the upstream port 52, it is known that training of the communication link 34 is automatically initiated. However, in one aspect of link speed recovery in accordance with the present description, it is recognized that resetting the optical transceiver 60 of the upstream port 52 may not achieve a successful training or retraining of the communication link 34. Accordingly, the multi-loop link speed recovery logic 32 (FIG. 2) of the storage controller 4 following the resetting of the optical transceiver 60 of the upstream port 52 and waiting a sufficient time for the optical transceiver 60 to reboot and the training to complete, determines (block 260, FIG. 6), whether the desired link speed such as full link speed, for example, has been achieved by the communication link retraining which was initiated at the upstream port 52 by resetting the optical transceiver 60 of the upstream port 52. In one embodiment, a wait of approximately 5 seconds may be appropriate, depending upon the particular application. As noted above, the link speed of the communication link may be determined by polling the status of the communication link 34. If full link speed was restored for the communication link 34, link speed recovery is terminated (block 240, FIG. 6).

Conversely, if it is determined (block 260, FIG. 6) that link speed training or retraining initiated by resetting the optical transceiver 60 of the upstream port 52 failed to achieve full link speed for the communication link 34, the multi-loop link speed recovery logic 32 (FIG. 2) of the storage controller 4 determines (block 264) whether all the sequential link speed recover commands of the main loop sequential command set (FIG. 7a) have been completed.

In this example, all the sequential link speed recover commands of the main loop sequential command set (FIG. 7a) have not been completed. Accordingly, the next-in-sequence link speed recovery command of the main loop sequential command set (FIG. 7a) is issued (block 256, FIG. 6). In this example, the next-in-sequence main loop sequential command of the sequence ML1-ML4 of main loop commands, is the fourth main loop command ML4 of the main loop sequential command set. As shown in FIG. 7a, the next-in-sequence main loop command ML4 commands the downstream optical transceiver 72 of the downstream port 68 to be reset.

Accordingly, the multi-loop link speed recovery logic 32 (FIG. 2) of the storage controller 4 issues suitable commands to the communication path host 44 which is a root complex in this example, and in response, the communication path host 44 issues suitable commands to the downstream optical transceiver 72 of the downstream port 68 via the out-of-band subpath 76a, the endpoint out-of-band controller 80 and the out-of-band subpath 76b to initiate a reset and reboot of the optical transceiver 72 at the downstream port 68 to initiate training or retraining the communication link 34 coupled to the downstream port 68.

In response to the resetting of the optical transceiver 72 of the downstream port 68, it is known that training of the communication link 34 is automatically initiated. However, in one aspect of link speed recovery in accordance with the present description, it is recognized that a single resetting the optical transceiver 72 of the downstream port 68 may not achieve a successful training or retraining of the communication link 34. Accordingly, the multi-loop link speed recovery logic 32 (FIG. 2) of the storage controller 4 following the resetting of the optical transceiver 72 of the downstream port 68, and waiting a sufficient time for the optical transceiver 72 to reboot and the training to complete, determines (block 260, FIG. 6) whether the targeted link speed such as full link speed, for example, has been achieved by the communication link training or retraining which was initiated at the downstream port 68 by resetting the optical transceiver 72 of the downstream port 68. In one embodiment, a wait of approximately 5 seconds may be appropriate, depending upon the particular application. If full link speed was restored for the communication link 34, link speed recovery is terminated (block 240, FIG. 6).

Conversely, if it is determined (block 260, FIG. 6) that link speed training or retraining initiated by resetting the optical transceiver 72 of the downstream port 68 failed to achieve full link speed for the communication link 34, the multi-loop link speed recovery logic 32 (FIG. 2) of the storage controller 4 determines (block 264) whether all the sequential link speed recover commands of the main loop sequential command set (FIG. 7a) have been completed. In this example, all the sequential link speed recover commands ML1-ML4 of the main loop sequential command set (FIG. 7a) have been completed as described above. Accordingly, the multi-loop link speed recovery logic 32 (FIG. 2) of the storage controller 4 determines (block 268, FIG. 6) whether a main loop execution maximum has been reached. In one embodiment, the execution of the main loop of sequential link speed recovery commands ML1-ML4 is repeated up to a maximum as represented by a variable "M" which may be 3 times, for example. However, it is appreciated that other maxima may be selected such as in a range of 3-5, for example, depending upon the particular application. If it is determined (block 268, FIG. 6) that repetition of the main loop execution of sequential link speed recovery commands ML1-ML4 has not reached the maximum M, the main loop execution of sequential link speed recovery commands ML1-ML4 is repeated at blocks 224-264 as described above until the reached the maximum M is reached.

It is believed that training or retraining of the communication link 34 to full link speed will be frequently achieved before the maximum M of main loop repetitions is reached. For example, it is believed that by repeating performance of a subloop of sequential link speed recovery commands within each main loop performance, and repeating performance of a main loop of sequential link speed recovery commands in accordance with one embodiment, reliability of link speed recovery to full link speed may be improved. However, if it is determined (block 268, FIG. 6) that repetition of the main loop execution of sequential link speed recovery commands ML1-ML4 has reached the maximum M without achieving retraining of the communication link 34 to full link speed, the main loop execution of sequential link speed recovery commands ML1-ML4 may be terminated (block 240) in one embodiment. In addition, any faulty or defective components of the communication path may be replaced and the link speed recovery process of FIG. 6 repeated.

Figure 8:
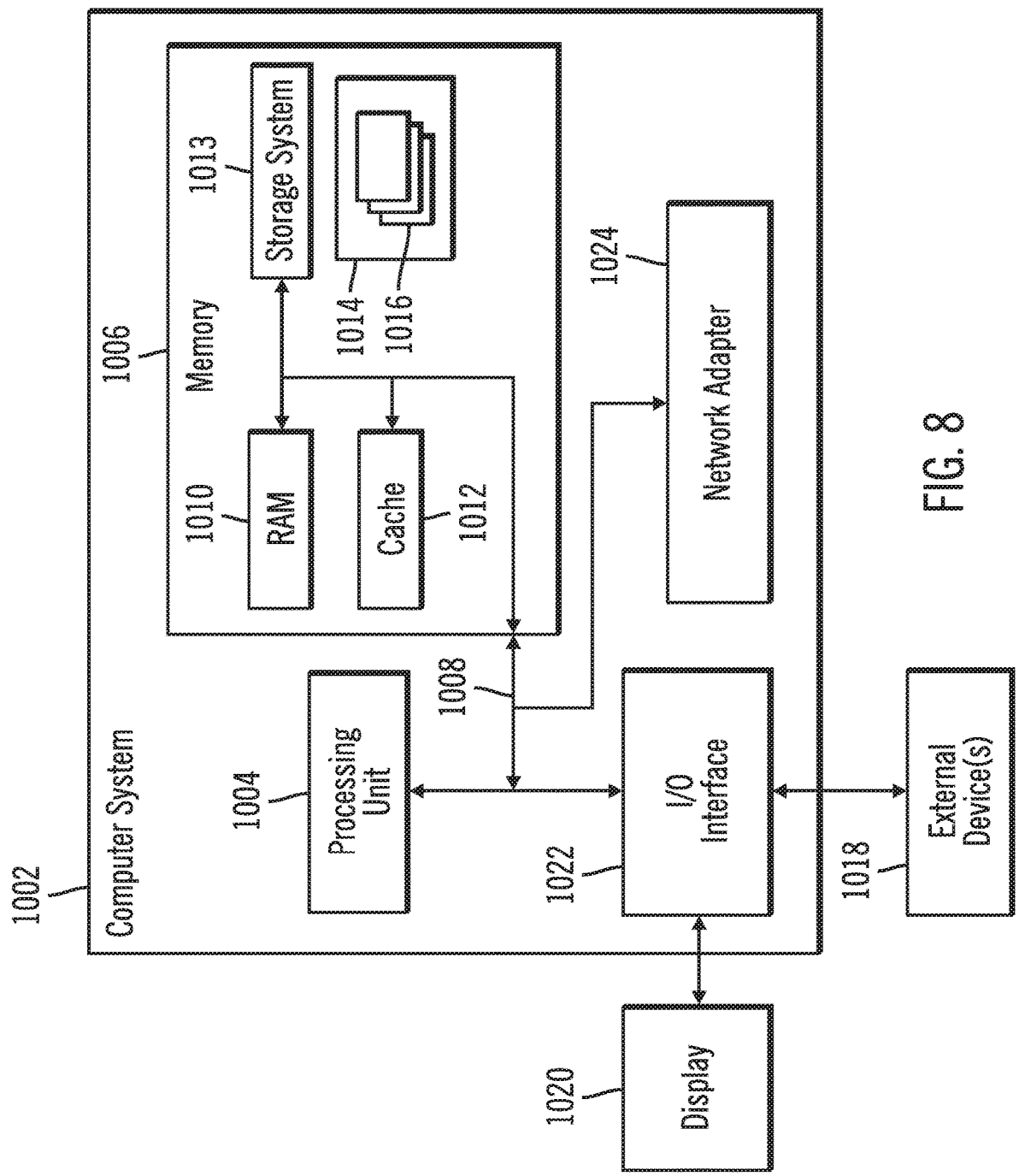
FIG. 8 illustrates a computer embodiment employing link speed recovery in a data storage system in accordance with the present description.

The computational components of the figures may each be implemented in one or more computer systems, such as the computer system 1002 shown in FIG. 8. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
performing link speed recovery to achieve a target link speed on a communication link including repeating performance of a main loop of sequential link speed recovery commands a first predetermined maximum number of times, each main loop performance of link speed recovery commands including repeating performance of a subloop of sequential link speed recovery commands within each main loop performance a second predetermined maximum number of times, each subloop performance of sequential link speed recovery commands including:
issuing a next-in-sequence link speed recovery command of a first set of sequential link speed recovery commands;
determining if the target link speed has been achieved after issuing a next-in-sequence link speed recovery command; and
terminating performance of link speed recovery if the target link speed has been achieved in response to a next-in-sequence link speed recovery command;
wherein each main loop performance of link speed recovery commands further includes after repeating performance of the subloop of link speed recovery commands the second predetermined maximum number of times:
issuing a next-in-sequence link speed recovery command of a second set of sequential link speed recovery commands;
determining if the target link speed has been achieved after issuing a next-in-sequence link speed recovery command; and
terminating performance of link speed recovery if the target link speed has been achieved in response to a next-in-sequence link speed recovery command.

2. The method of claim 1 wherein each main loop performance of link speed recovery commands further includes after repeating performance of the main loop of link speed recovery commands the first predetermined maximum number of times, terminating performance of link speed recovery if the target link speed has not been achieved in response to a link speed recovery command.

3. The method of claim 1 wherein each subloop performance of link speed recovery commands further includes:
issuing another next in-sequence link speed recovery command of the first set of link speed recovery commands if the target link speed has not been achieved in response to a link speed recovery command of the first set;
determining if the target link speed as been achieved after issuing another next in-sequence link speed recovery command of the first set; and
terminating performance of link speed recovery if the target link speed has been achieved in response to another next in-sequence link speed recovery command of the first set.

4. The method of claim 1 wherein each main loop performance of link speed recovery commands further includes:
issuing another next in-sequence link speed recovery command of the second set of link speed recovery commands if the target link speed has not been achieved in response to a link speed recovery command of the second set;
determining if the target link speed as been achieved after issuing another next in-sequence link speed recovery command of the second set; and
terminating performance of link speed recovery if the target link speed has been achieved in response to another next-in-sequence link speed recovery command of the second set.

5. The method of claim 1 wherein the first set of sequential link speed recovery commands of the subloop of sequential link speed recovery commands includes at least one of setting a configuration bit of a register at an upstream port coupled to the communication link, sending an out-of-band signal to set a configuration bit of a register of a downstream port coupled to the communication link, initiating a disable-enable cycle of the upstream port and sending an out-of-band signal to initiate a disable-enable cycle of the downstream port.

6. The method of claim 1 wherein the second set of sequential link speed recovery commands of the main loop of sequential link speed recovery commands includes at least one of initiating the subloop of sequential link speed recovery commands, initiating a resetting and reinitialization of a communication path switch which includes an upstream port having an upstream optical transceiver coupled to the communication link, resetting the upstream optical transceiver and sending an out-of-band signal to reset a downstream optical transceiver coupled to the communication link.

7. A computer program product configured for use with a computer system having a host, and a data storage system having a storage controller and at least one storage unit controlled by the storage controller and configured to store data, wherein the computer system has a communication path switch having an upstream port having an upstream transceiver, an endpoint device having a downstream port having a downstream transceiver, a communication link coupled to the upstream port and the downstream port, and at least one processor, and wherein the computer program product comprises a computer readable storage medium having program instructions embodied therewith, the program instructions executable by a processor of the computer system to cause computer system operations, the computer system operations comprising:
performing link speed recovery to achieve a target link speed on the communication link including repeating performance of a main loop of sequential link speed recovery commands a first predetermined maximum number of times, each main loop performance of link speed recovery commands including repeating performance of a subloop of sequential link speed recovery commands within each main loop performance a second predetermined maximum number of times, each subloop performance of sequential link speed recovery commands including:
issuing a next-in-sequence link speed recovery command of a first set of sequential link speed recovery commands;
determining if the target link speed as been achieved after issuing a next-in-sequence link speed recovery command; and terminating performance of link speed recovery if the target link speed has been achieved in response to a next-in-sequence link speed recovery command;

wherein each main loop performance of link speed recovery commands further includes after repeating performance of the subloop of link speed recovery commands the second predetermined maximum number of times:

issuing a next-in-sequence link speed recovery command of a second set of sequential link speed recovery commands;

determining if the target link speed has been achieved after issuing a next-in-sequence link speed recovery command; and terminating performance of link speed recovery if the target link speed has been achieved in response to a next-in-sequence link speed recovery command.

8. The computer program product of claim 7 wherein each main loop performance of link speed recovery commands further includes after repeating performance of the main loop of link speed recovery commands the first predetermined maximum number of times, terminating performance of link speed recovery if the target link speed has not been achieved in response to a link speed recovery command.

9. The computer program product of claim 7 wherein each subloop performance of link speed recovery commands further includes:

issuing another next in-sequence link speed recovery command of the first set of link speed recovery commands if the target link speed has not been achieved in response to a link speed recovery command of the first set;

determining if the target link speed as been achieved after issuing another next in-sequence link speed recovery command of the first set; and terminating performance of link speed recovery if the target link speed has been achieved in response to another next in-sequence link speed recovery command of the first set.

10. The computer program product of claim 7 wherein each main loop performance of link speed recovery commands further includes:

issuing another next in-sequence link speed recovery command of the second set of link speed recovery commands if the target link speed has not been achieved in response to a link speed recovery command of the second set;

determining if the target link speed as been achieved after issuing another next in-sequence link speed recovery command of the second set; and terminating performance of link speed recovery if the target link speed has been achieved in response to another next-in-sequence link speed recovery command of the second set.

11. The computer program product of claim 7 wherein the first set of sequential link speed recovery commands of the subloop of sequential link speed recovery commands includes at least one of setting a configuration bit of a register at the upstream port coupled to the communication link, sending an out-of-band signal to set a configuration bit of a register of the downstream port coupled to the communication link, initiating a disable-enable cycle of the upstream port and sending an out-of-band signal to initiate a disable-enable cycle of the downstream port.

12. The computer program product of claim 7 wherein the upstream transceiver is an optical transceiver and the downstream transceiver is an optical transceiver and wherein the second set of sequential link speed recovery commands of the main loop of sequential link speed recovery commands includes at least one of initiating the subloop of sequential link speed recovery commands, initiating a resetting and reinitialization of the communication path switch, resetting the upstream optical transceiver and sending an out-of-band signal to reset the downstream optical transceiver.

13. A computer system for use with a host, comprising:

a storage controller;

at least one storage unit controlled by the storage controller and configured to store data;

a communication path switch having an upstream port having an upstream transceiver;

an endpoint device having a downstream port having a downstream transceiver;

a communication link coupled to the upstream port and the downstream port and configured to transfer data between the upstream port and the downstream port;

at least one processor in the computer system; and a computer program product comprising a computer readable storage medium having program instructions embodied therewith, the program instructions executable by a processor of the computer system to cause computer system operations, the computer system operations comprising:

performing link speed recovery to achieve a target link speed on the communication link including repeating performance of a main loop of sequential link speed recovery commands a first predetermined maximum number of times, each main loop performance of link speed recovery commands including repeating performance of a subloop of sequential link speed recovery commands within each main loop performance a second predetermined maximum number of times, each subloop performance of sequential link speed recovery commands including:

issuing a next-in-sequence link speed recovery command of a first set of sequential link speed recovery commands;

determining if the target link speed as been achieved after issuing a next-in-sequence link speed recovery command; and terminating performance of link speed recovery if the target link speed has been achieved in response to a next-in-sequence link speed recovery command;

wherein each main loop performance of link speed recovery commands further includes after repeating performance of the subloop of link speed recovery commands the second predetermined maximum number of times:

issuing a next-in-sequence link speed recovery command of a second set of sequential link speed recovery commands;

determining if the target link speed has been achieved after issuing a next-in-sequence link speed recovery command; and terminating performance of link speed recovery if the target link speed has been achieved in response to a next-in-sequence link speed recovery command.

14. The computer system of claim 13 wherein each main loop performance of link speed recovery commands further includes after repeating performance of the main loop of link speed recovery commands the first predetermined maximum number of times, terminating performance of link speed recovery if the target link speed has not been achieved in response to a link speed recovery command.

15. The computer system of claim 13 wherein each subloop performance of link speed recovery commands further includes:

issuing another next in-sequence link speed recovery command of the first set of link speed recovery commands if the target link speed has not been achieved in response to a link speed recovery command of the first set;

determining if the target link speed as been achieved after issuing another next in-sequence link speed recovery command of the first set; and terminating performance of link speed recovery if the target link speed has been achieved in response to another next in-sequence link speed recovery command of the first set.

16. The computer system of claim 13 wherein each main loop performance of link speed recovery commands further includes:

issuing another next in-sequence link speed recovery command of the second set of link speed recovery commands if the target link speed has not been achieved in response to a link speed recovery command of the second set;

determining if the target link speed as been achieved after issuing another next in-sequence link speed recovery command of the second set; and terminating performance of link speed recovery if the target link speed has been achieved in response to another next-in-sequence link speed recovery command of the second set.

17. The computer system of claim 13 wherein the first set of sequential link speed recovery commands of the subloop of sequential link speed recovery commands includes at least one of setting a configuration bit of a register at the upstream port coupled to the communication link, sending an out-of-band signal to set a configuration bit of a register of the downstream port coupled to the communication link, initiating a disable-enable cycle of the upstream port and sending an out-of-band signal to initiate a disable-enable cycle of the downstream port.

18. The computer system of claim 13 wherein the upstream transceiver is an optical transceiver and the downstream transceiver is an optical transceiver and wherein the second set of sequential link speed recovery commands of the main loop of sequential link speed recovery commands includes at least one of initiating the subloop of sequential link speed recovery commands, initiating a resetting and reinitialization of the communication path switch, resetting the upstream optical transceiver and sending an out-of-band signal to reset the downstream optical transceiver.

* * * * *